UNITED STATES PATENT OFFICE.

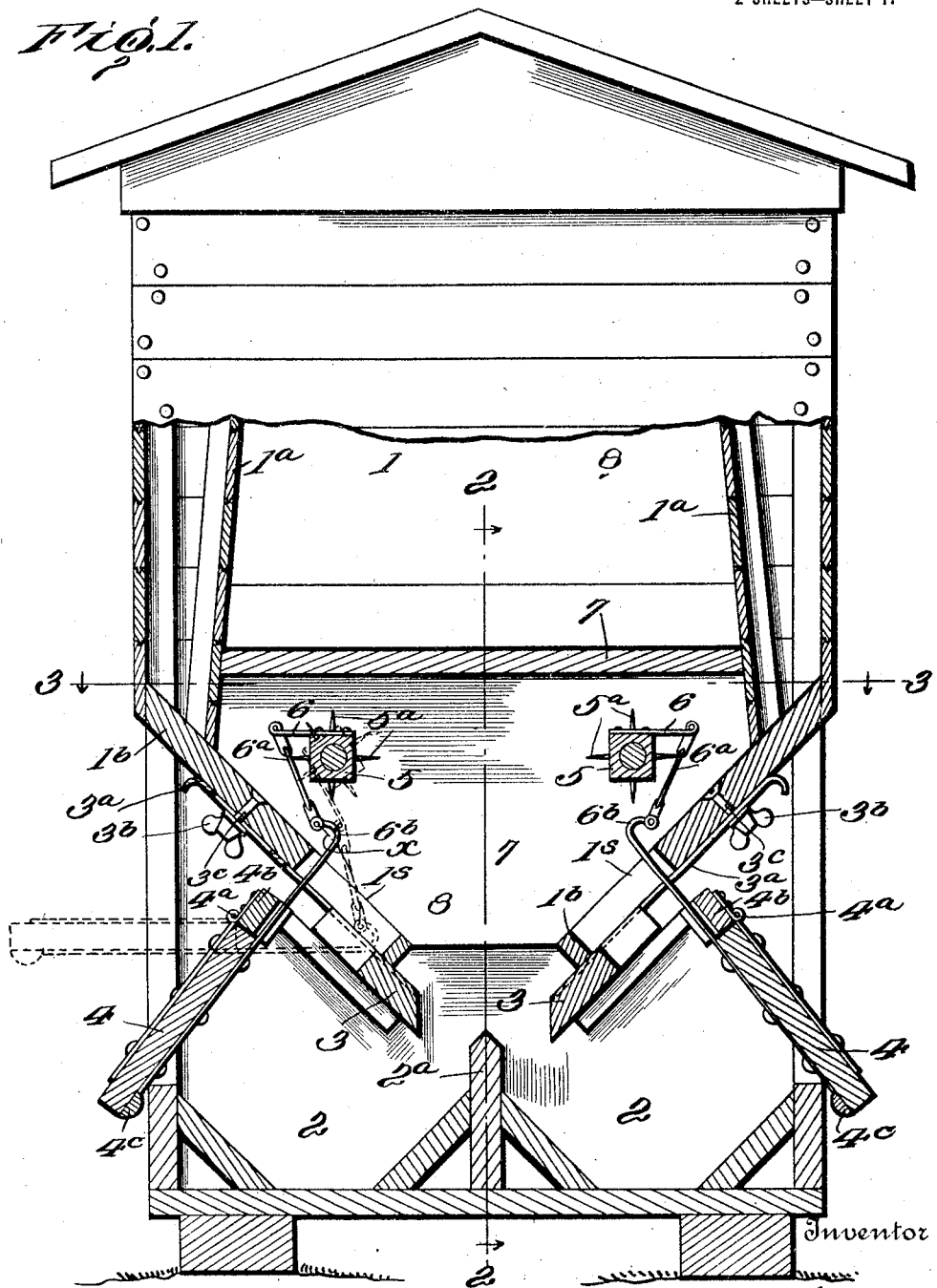

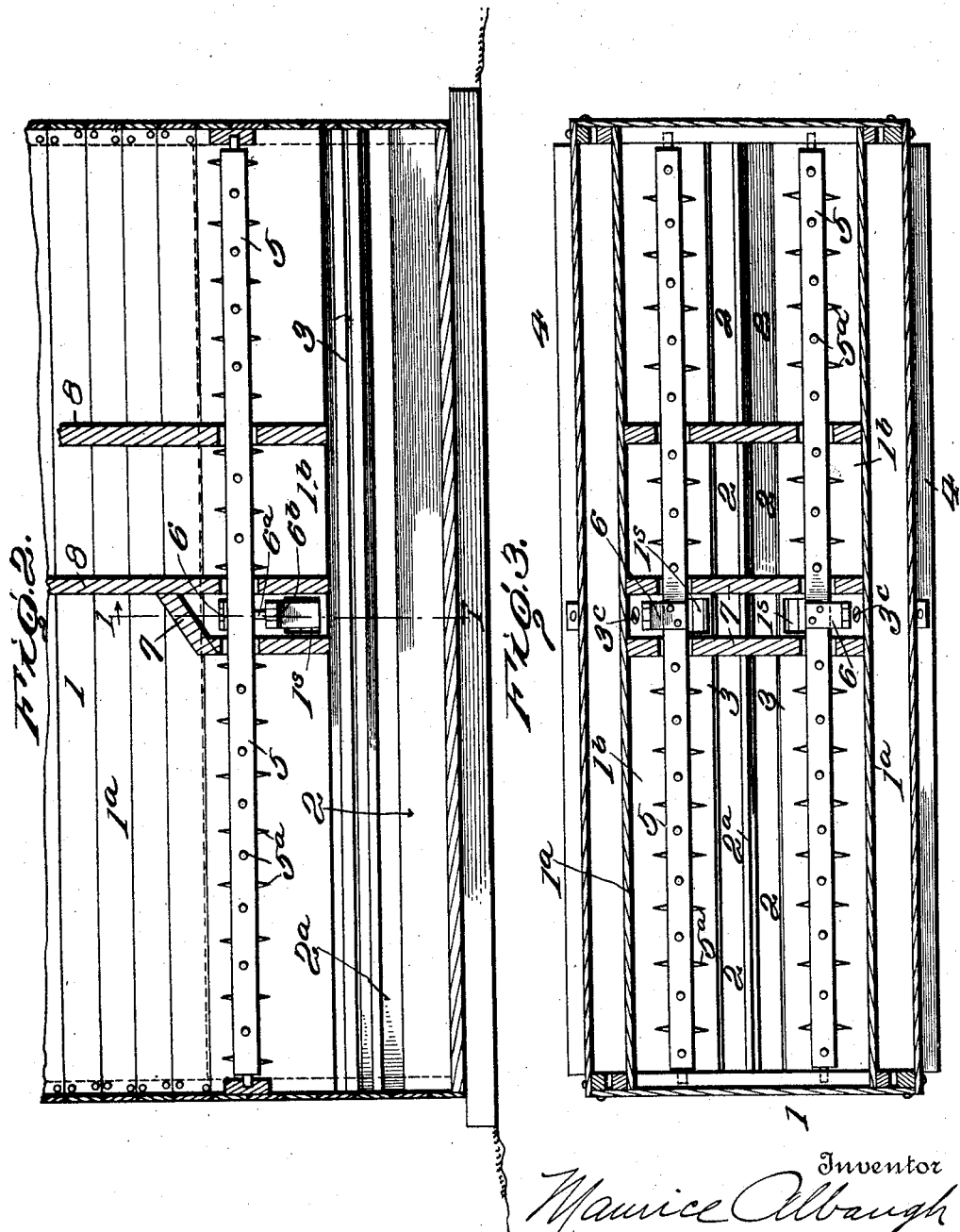

MAURICE ALBAUGH, OF QUINCY, OHIO.

FEEDER FOR HOGS.

1,333,528.      Specification of Letters Patent.      Patented Mar. 9, 1920.

Application filed March 19, 1919. Serial No. 283,493.

*To all whom it may concern:*

Be it known that I, MAURICE ALBAUGH, a citizen of the United States, residing at Quincy, in the county of Logan and State of Ohio, have invented certain new and useful Improvements in Feeders for Hogs; and I hereby declare that the following is a full, clear, and exact description thereof, reference being had to the accompanying drawings, which form part of this specification.

This invention relates to stock feeding apparatus; and is a feeder for hogs. The feeder is adapted to supply feed to the trough as required by the animal, and is operated to supply the feed from the bin to the trough by the animal's action in lifting the cover of the trough.

The feeder in brief comprises a preferably oblong bin, with its sides sloping outwardly and downwardly toward its hopper-like bottom so as to allow the feed to readily fall by gravity into the hopper. In the bin near the bottom are agitator bars that preferably extend from end to end of the bin and which are rocked back and forth by peculiar sets of levers connecting the bars to the hinged covers, outside of the bin covering the troughs from which the hogs eat. The vertical or swinging motions of the covers when raised by the animals cause the agitator bars to turn and stir the feed and cause it to feed down; the rocking motion of the agitator bars together with the peculiar shape of the bin insuring the proper supply of the feed to the troughs. The covers are raised by the hogs, and they close or drop by gravity. The invention has particular reference to the novel means for operating the agitator bars by the covers.

In the accompanying drawings I have illustrated a practical form of feeder embodying the invention and will describe the same with reference thereto, and in the claims summarize the novel features and combinations of parts for which protection is desired.

In said drawings:

Figure 1 is a part side elevation and part central transverse section (enlarged) on line 1—1, Fig. 2.

Fig. 2 is a reduced longitudinal vertical section through the lower part of the feeder on line 2—2, Fig. 1.

Fig. 3 is a reduced horizontal longitudinal section on line 3—3, Fig. 1.

As shown in the drawings the feeder comprises a bin 1 which may be of any desired size and made of any suitable material. The bin preferably has a hopper-shaped bottom formed of oppositely inclined walls $1^b$, which converge at an angle of about 45° to the vertical leaving a space between their lower edges for the flow of the feed.

The bin 1 is narrower at top than at the top of the hopper-bottom; the side walls $1^a$ of the bin diverging downwardly toward the hopper-bottom; and this facilitates the descent of the material in the bin and prevents its choking. If desired the bin may be divided by transverse partitions 8 into a plurality of separate compartments so that more or less of the bin capacity can be utilized, according to the number of hogs to be fed.

Below the hopper the feeder has parallel troughs 2, one on each side, which are separated by a longitudinal divider board $2^a$; and the passage of the feed from the hopper into the troughs is controlled by slidable boards or valves 3, which are adjustably supported in any suitable way underneath the hopper-boards $1^b$; and as shown are provided with adjusting bars $3^a$ which may be slotted for the passage of bolts $3^c$ and can be fastened, in adjusted position, by wing nuts $3^b$ on the bolts, as shown. By adjusting these sliding boards 3 the amount of feed entering the troughs is regulated.

The divider board $2^a$ divides the feed escaping from the bin and directs it into the troughs. It also forms part of the inner wall of each trough. Said divider board is vertically disposed and only beveled on its upper edge at the point where the feed is delivered from the hopper to the troughs. This thin divided board arranged in vertical position permits the feed to drop directly into the troughs from the bin, between the upper end of the divider board and the lower ends of the valve boards 3, instead of having to slide from the bin into the trough over inclined boards, as in the ordinary construction of feeders.

Having the bin wider at the bottom and the divider board vertical renders the feeder practical for feeding ground feeds which will not slip down inclines.

Each trough 2 is closable by a cover 4, which is connected by hinges $4^a$ to a bar $4^b$, extending above the trough, or to some other suitable part of the feeder; and these covers normally close the troughs 2 by gravity, but each cover can be raised by a hog inserting his snout under the lower edge thereof, which is preferably provided with a rounded bead 4ᶜ to facilitate its raising by the hog and prevent injury to the animal.

The hog after lifting the cover can push his head into the trough 2 and get the feed; and when he withdraws from beneath the cover the latter will fall by gravity and close the trough.

Extending longitudinally of the bin, and preferably within the hopper-bottom and at opposite sides of the center thereof, are agitator bars 5 which may be rotatably supported in bearings of any suitable kind in or on the end walls of the bin or hopper. These bars are preferably rectangular in cross section, so that when they turn they will agitate the feed. The location of the agitator bars in the bin may be varied. If desired the bars 5 may be provided with spurs or pins as 5ᵃ projecting from their sides to increase the agitating effect upon the feed when the bars are rocked.

Each agitator bar 5 is operatively connected to the adjacent cover 4 by novel devices. As shown to each bar 5 is bolted a metal strap or arm 6 which projects at approximately right angles to the bar, and its outer end is pivotally connected to the upper end of a metal strap 6ᵇ which is bolted to the adjacent cover, as shown, so as to swing therewith. The strap 6ᵇ projects into the bin or hopper through a slot 1ˢ in the adjacent side of the hopper 1ᵇ, which permits the strap 6ᵇ to swing with the cover. Of course when the cover is raised the strap 6ᵇ swings with it, turning therewith on the hinge 4ᵃ as a pivot, and the inner end 6ᵇ of the strap will move or swing in an arc, (as indicated by dotted lines x, in Fig. 1) and cause the link 6ᵃ to move the end of the arm 6 and turn the connected agitator bar on its axis, more or less, according to the extent of opening of the cover.

The agitator bar operating devices are preferably arranged at the center of the feeder, and the parts of the operative devices (straps 6ᵇ, links 6ᵃ and arms 6) within the bin are preferably housed within a transverse hollow semi-partition 7, so that the material in the bin will not come in contact with or choke such operative devices.

The hog in search of feed can raise a cover with his snout and the cover turning on its hinges causes strap 6ᵇ to move the link 6ᵃ and the arm 6 and partly rotate the connected agitator bar, and this bar stirs the feed in the bin and hopper-bottom so that the feed moves to the opening in the hopper and escapes into the troughs. The flow of the feed from the bin is regulated by the sliding boards 3.

This feeder will keep the feed dry at all times, even when the hogs are eating. No stock can eat out of it except pigs and hogs. Ground feed will not clog therein; but it can be economically used for feeding whole grains, as well as ground mill feed. It has no springs, weights, cables, ratchets, pawls, chains or gearing to get out of order; it requires no especial instructions for use; and requires no attention other than filling.

What I claim is:

1. A stock feeder, comprising a bin having an outlet opening in its bottom, a trough below the bin; a hinged cover for the trough; an agitator bar within the bin above the outlet opening; an arm connected with said bar within the bin; a strap connected with the cover and extending into the bin; and a link connected with said arm and with the inner end of said strap; whereby when the cover is raised by the animal or lowered by gravity the agitator bar is rocked.

2. A stock feeder comprising a bin having an outlet opening at center and a slot at one side of such opening; a trough below the bin; a hinged cover for the trough; a rocking agitator bar extending longitudinally of and within the bin; an arm connected with said bar within the bin; a strap connected with the cover and projecting through said slot into the bin; and a link connecting the inner end of said strap with the said arm; whereby when the cover is raised by the animal or lowered by gravity the agitator bar is rocked, substantially as described.

In testimony that I claim the foregoing as my own, I affix my signature.

MAURICE ALBAUGH.